United States Patent [19]

Belrose

[11] Patent Number: 4,800,662
[45] Date of Patent: Jan. 31, 1989

[54] MAGNETIC MAP MARKER

[76] Inventor: Frank R. Belrose, 2349 Dodd Rd., Mendota Heights, Minn. 55120

[21] Appl. No.: 13,258

[22] Filed: Feb. 11, 1987

[51] Int. Cl.$^4$ ............................................. G09F 19/00
[52] U.S. Cl. .......................................... 40/426; 40/621
[58] Field of Search ................. 40/600, 621, 110, 426; 434/73, 153; 273/239; 335/304, 301

[56] References Cited

U.S. PATENT DOCUMENTS

| | | | |
|---|---|---|---|
| 2,282,430 | 5/1942 | Smith | 40/426 |
| 2,525,738 | 10/1950 | Tormey | 273/239 |
| 2,761,413 | 9/1956 | Breer | 40/600 |
| 2,951,703 | 9/1960 | Arnold, Jr. | 273/239 |
| 2,988,835 | 6/1961 | Murphy | 40/616 |
| 3,001,308 | 9/1961 | Potter | 40/110 |
| 3,116,929 | 1/1964 | Kernodle | 40/426 |
| 3,670,435 | 6/1972 | Steward | 40/621 |
| 3,685,170 | 8/1972 | Fairleigh | 273/239 |

FOREIGN PATENT DOCUMENTS

| | | | |
|---|---|---|---|
| 207658 | 3/1984 | Fed. Rep. of Germany | 273/239 |
| 86/07271 | 12/1986 | PCT Int'l Appl. | 40/621 |
| 566608 | 9/1975 | Switzerland | 40/110 |
| 2066085 | 7/1981 | United Kingdom | 273/239 |

*Primary Examiner*—Gene Mancene
*Assistant Examiner*—Cary E. Stone
*Attorney, Agent, or Firm*—James V. Harmon

[57] ABSTRACT

A magnetic marker is provided for maps comprising a marking unit of predetermined shape for the front surface of the map and including a magnetic material such as a sheet of soft iron. A magnet is provided for the rear surface of the map to attract the marker and hold it in place. The magnet is a double-faced magnet having north and south poles on an active face.

4 Claims, 1 Drawing Sheet

U.S. Patent    Jan. 31, 1989    4,800,662
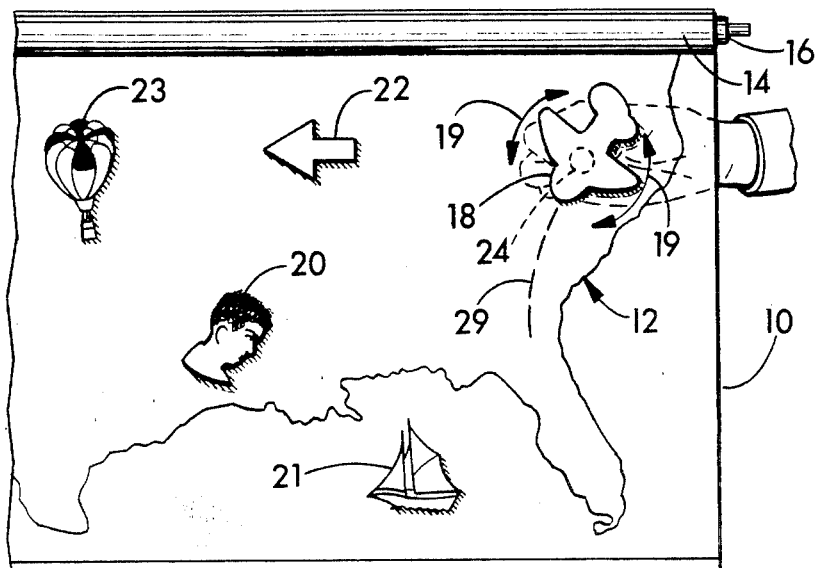
FIG. 1
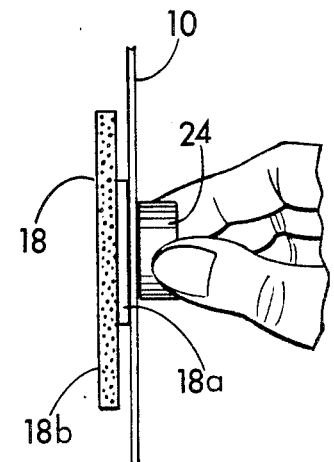
FIG. 2
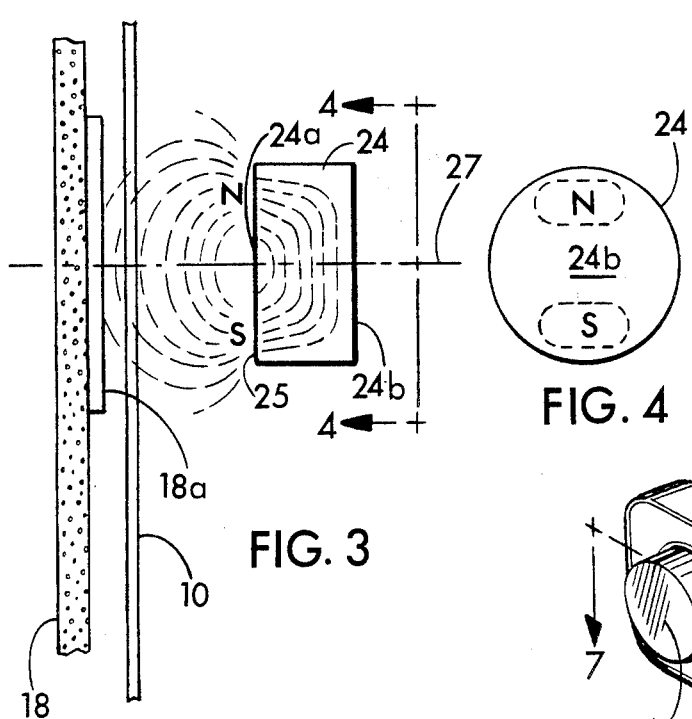
FIG. 3
FIG. 4
FIG. 5
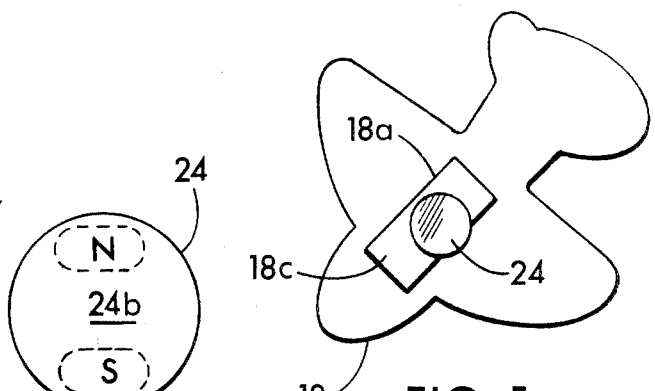
FIG. 6
FIG. 7

MAGNETIC MAP MARKER

FIELD OF THE INVENTION

The present invention relates to display devices and more particularly to a display device formed at least partially from magnetic material.

BACKGROUND OF THE INVENTION

A great many markers and displays have been previously proposed and some of them have included a marker containing magnetic material that is held in place by means of a magnet positioned adjacent to it on the opposite side of a flat display surface. Such devices have been used for indicating the whereabouts and availability of office personnel. The present invention by contrast must allow the display units to be moved easily by sliding them in any direction and at the same time enabling them to be pivoted about a central horizontal axis passing through their center and perpendicular to the surface of the map upon which they are located. Many designs were evaluated in the course of developing the present invention. It was found that while an ordinary magnet could be used to move the display pieces vertically or horizontally, it could not be used to turn or twist the display pieces so that they could be pointed in the right direction as in the case of, say, an arrow or vehicle such as an airplane or oriented in an upright position as in the case of a marker shaped like a face.

In view of these deficiencies of the prior art, it is a major objective to provide an improved magnetic marker for a map to be used in an educational setting such as a grade or high school setting to make the information being taught more understandable and to provide a means for demonstrating, plotting or positioning markers on a map that is more clear, more graphic, more effective and more interesting to the students. A further object is provide a marker that will hold the marking units securely in place and will at the same time allow them to be turned about an axis extending perpendicular to the map surface.

These and other more detailed and specific objects of the invention will be apparent in view of the following drawings and specification which illustrate the invention by way of example.

SUMMARY OF THE INVENTION

The present invention provides a magnetic map marker having a marker unit suited for placement in contact with the front surface of a commercially available map. The marker has a display surface with printed material or drawings on it. The opposite or rear surface of the marker is smooth and adapted to slide easily across the surface of the map. The marker includes a magnetic material such as a strip of soft iron, preferably positioned on the rear surface of the marker so as to contact the map and a double-faced magnet for magnetically attracting the marker and holding it in place on the map from a position on the rear side of the map. The double-faced magnet is provided with substantially parallel front and rear faces. The front face is magnetically active and includes spaced apart north and south poles. The rear face of the magnet is magnetically inactive. By providing the poles on a flat face, the magnetic flux emanates from substantially the entire front face of the magnet and because of the bipolarity thereof, it is possible to turn the marker by manually turning the magnet.

THE FIGURES

FIG. 1 is a partial elevational view of a map including several markers in accordance with the invention.

FIG. 2 is a side view on a larger scale of a portion of the map and marker of FIG. 1.

FIG. 3 is a still further enlarged view of the marker as seen in side view.

FIG. 4 is a side elevational view taken on line 4—4 of FIG. 3.

FIG. 5 is a rear view of the marker assembly.

FIG. 6 is a modified form of the invention and

FIG. 7 is a view taken on line 7—7 of FIG. 6.

DETAILED DESCRIPTION OF THE INVENTION

In a school setting, map demonstrations can become dull and tedious. The present invention provides an interesting and graphic display that will hold the attention of the students and hence facilitate the teaching process and the retention of information being taught. It will also add a third dimension to a flat map, and both the teacher and children can make use of the invention.

The map 10 shown in FIG. 1 includes a drawing representing geographic features such as an outline of the United States 12 and is normally stored on a roll 14 supported by an arbor 16. Positioned on the map 10 are one or several magnetic markers indicated 18, 20, 21, 22 and 23. While the markers 18-23 can have any desired outline or a three-dimensional shape, they are preferably formed from flat sheet stock such as a flat sheet 18b of a lightweight durable material, e.g., a strong plastic foam sheet. The sheets 18b are cut to any desired shape required. The marker 18 is cut to the shape of an airplane, 20 a head, 21 a sailboat, 22 the shape of an arrow, and 23 a balloon with printed indicia on the top or display surface representing a cross or "X." To the back of each of these sheets 18b representing an airplane, an arrow or any other shape is a magnetic material such as, in this case, a flat sheet 18a of soft iron with a smooth surface 18c adapted to slide smoothly in any direction on the display surface of the map 10. While the strip 18c is not magnetized in this case, it could, if desired, be formed from a magnet. This would, however, increase the cost of the unit and is not considered necessary.

The other component of the magnetic marker is a magnet 24 which comprises a double-faced magnet having a pair of substantially parallel front and rear faces 24a and 24b joined by a cylindrical side wall 25. The front face 24a of the magnet 24 is an active face having north and south poles as indicated in FIGS. 3 and 4 on the same face, whereas the rear surface 24b is magnetically inactive or, to be precise, is magnetically substantially less active. For convenience herein, the rear surface 24b will be referred to as magnetically inactive, even though a small object such as a pin will be attracted to it. The same pin will, however, be attracted much more strongly to the north and south poles on the active face 24b. It can be seen that the entire front face 24a of the magnet 24 is magnetically active and the one portion thereof comprises the center of the north pole N; another spaced apart portion comprises the center of the south pole S indicated by dotted lines in FIG. 4. Internal flux lines within the magnet 24 are indicated clearly in FIG. 3 as are the external flux lines emanating from the N and S poles. Because the entire face 24a is active, the magnetic attraction for the marker 18 is maximized. In addition, because the face 24a is smooth, it can be easily slid manually or pivoted while in contact with the rear surface of the map 10. When pivoted in this manner as shown by an arrow indicated with the number 19 in FIG. 1, the marker can be easily turned and properly oriented about a central horizontal axis 27 extending perpendicular to the face of the map 10. In this way the airplane 18 can be turned in the proper direction so that it will slide nose-first as it is moved on the map, say in a southerly direction from New York to Florida, as indicated by the dotted line 29 in FIG. 1.

In FIGS. 6 and 7 is shown a magnet holder 26 for the magnet 24 which comprises a hollow socket formed from plastic having a hollow interior 30 of just the proper dimensions to slide over the end of a ruler 32 or other elongated article. A pocket 28 is provided to hold the magnet 24 with the active face 24a facing outwardly. Using this magnet holder 26 and the extension provided by the ruler 32, the teacher or a student can easily move display markers about on the map to any position desired without having to place a hand behind the map.

Thus, during use, magnet 24 is located behind the map in alignment with the marker 18, 20, 21, 22 or 23 as the case may be. When the teacher desires to move the marker from one point to another, he simply grasps the magnet from behind and moves in the desired direction or turns it on the axis 27 to position it upright or point it in the right direction producing the impression that the marker has moved by itself, thereby adding to the interest and excitement of a map demonstration. While some of the markers have been shown, there are other possibilities such as boats, rockets, the word "North," "South," "East," "West," balloons, mineral cutouts and the like. The invention has a variety of applications including military maneuvers, reviewing battle plans, planning strategy, etc., and in any such application will make the teaching more vivid and understandable.

Many variations of the invention are possible. For example, the soft iron sheet 18a can be bonded to the plastic layer 18b in any suitable manner as by adhesive. The magnet 24 can be formed from iron but is preferably a ceramic magnet. It can be held in the pocket 28 in any suitable manner as by means of adhesive or just by friction. Other variations of the invention within the scope of the appended claims will be apparent to those skilled in the art once the principles described herein are understood.

What is claimed is:

1. A magnetic map marker comprising a marker unit suited for placement adjacent the front surface of the map, said marker unit having a display surface and a smooth map contacting surface adapted to slide easily over a surface of the map, said marker unit including a magnetic material, a double-faced magnet for magnetically attracting the marker and holding it in place from a position on the rear side of the map, said double-faced magnet having front and rear faces, said front face being magnetically active and having spaced apart north and south magnetic poles thereon, the other face of the magnet being the magnetically inactive face, whereby the marker can be slid manually by moving the magnet in any desired direction across the back of the map or pivoted about a central axis perpendicular to the map by manually turning the double-faced magnet about said axis, and a magnet holder having a socket therein to receive the end of a ruler or like elongated article and a recess to hold the magnet in place thereon, thereby attaching the magnet to the elongated article.

2. The map marker of claim 1 wherein the marker is formed from a flat sheet of strong, lightweight nonmagnetic synthetic plastic material having a predetermined outline representing the shape of an article, the location of which is to be designated on the map.

3. The marker of claim 1 wherein the double-faced magnet comprises a double-faced disk magnet having parallel active and inactive faces and a side wall extending between the faces and said double-faced magnet is a ceramic magnet.

4. The marker of claim 1 wherein the marker includes a bilayer structure comprising a flat sheet of foam plastic material having printed indicia upon a display surface on one side thereof and a sheet of ferromagnetic material bonded to an opposite face thereof, said marker having a predetermined outline configuration representing an article, the presence of which is to be indicated upon the map.

* * * * *